June 17, 1958  R. E. CLAYTON  2,839,117
SELF CLEANING BUTYL VULCANIZATES
Filed Dec. 29, 1955
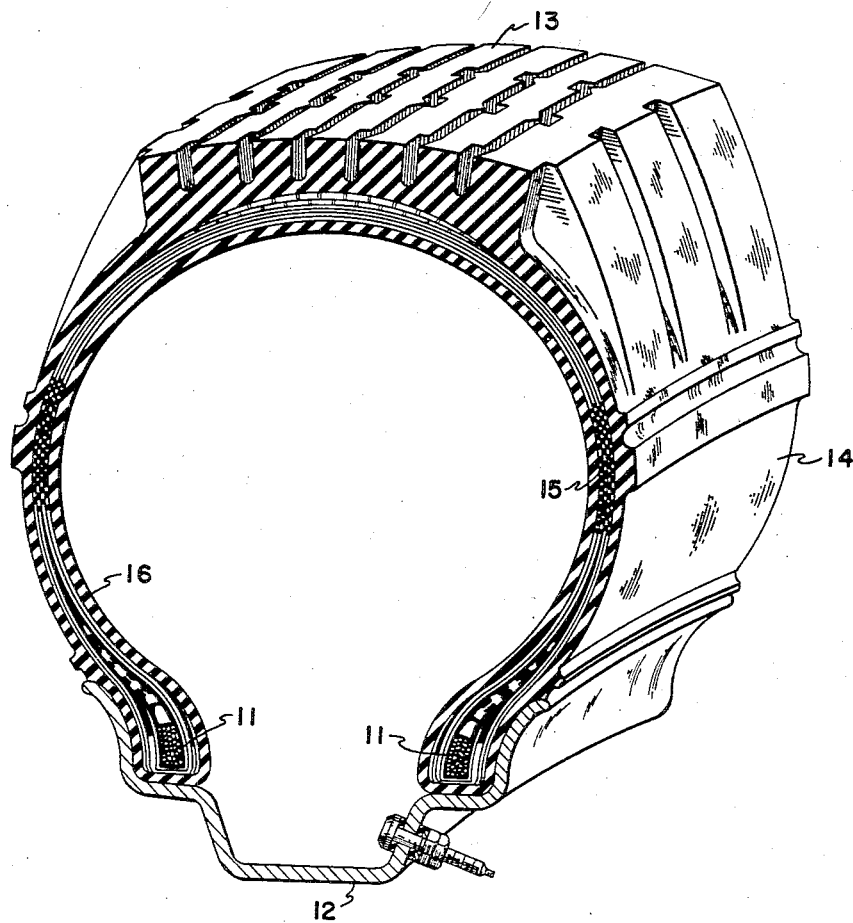
Robert E. Clayton    Inventor
By W. H. Smyers    Attorney United States Patent Office 2,839,117
Patented June 17, 1958

2,839,117

SELF CLEANING BUTYL VULCANIZATES

Robert E. Clayton, Roselle Park, N. J., assignor to Esso Research and Engineering Company, a corporation of Delaware Application December 29, 1955, Serial No. 556,347

19 Claims. (Cl. 152—330)

This invention relates to vulcanizable light colored rubbery polymeric compositions of self cleaning characteristics and of improved weathering and discoloring resistance. The present invention relates more particularly to vulcanizable and vulcanized rubbery copolymers of isoolefins and multiolefins in composition with certain proportions of calcium oxide, titanium dioxide, and zinc oxide, wherein relatively large amounts of calcium oxide are present.

When butyl rubber is compounded with carbon black and cured, the product exhibits exceptionally good weathering resistance. However, butyl rubber white vulcanizates have heretofore weathered badly, becoming tacky and discolored. This has been a serious deterrent to the use of butyl rubber white sidewall tires, although butyl rubber is primarily of interest for premium grade tires and premium tires are made with white sidewalls. The automotive industry, as well as other industries, is also desirous of making white and pastel colored parts from butyl rubber that will look attractive and in harmony with various painted parts and upholstery. Also, in the insulated wire industry, it would be desirable to make white and pastel shades of butyl rubber insulations, plug coverings, etc. Furthermore, white and pastel colored butyl rubber vulcanizates are envisioned in household equipment.

According to the present invention, it has been discovered that when butyl rubber is combined with calcium oxide, as well as titanium dioxide and zinc oxide, white vulcanizates may be obtained which resist weathering, discoloration, do not craze, do not crack, and surprisingly exhibit self-cleaning characteristics.

It has further been found that particularly good results are obtained when relatively large amounts of calcium oxide such as at least 10 parts by weight and preferably at least about 20 parts by weight up to about 150 parts by weight (especially 20 to 75 parts by weight) of calcium oxide per 100 parts of butyl rubber are employed. These proportions of calcium oxide are advantageously combined with about 10 to 150 preferably 25 to 100 parts by weight of titanium dioxide, and about 3 to 50, preferably 5 to 30 parts by weight of zinc oxide per 100 parts of butyl rubber.

The invention will be best understood with reference to the drawing in which the single figure is a cross-sectional view of a pneumatic tubeless tire employing therein the self-cleaning, light colored butyl rubber of the present invention wherein the tire is depicted as being mounted on a conventional tubeless-type of tire wheel-rim.

Butyl rubber or GR–I rubber (Government Rubber-Isobutylene) as referred to in the prior art comprises the copolymerization product of a major proportion of a $C_4$–$C_8$ isoolefin and a $C_4$–$C_{14}$ multiolefin.

Copolymers of the above general type, especially where the copolymer is of about 70 to 99.5% isobutylene with about 0.5 to 30% of a $C_4$ to $C_8$ or $C_{10}$ conjugated diolefin such as isoprene, butadiene, dimethallyl, allo-ocimene, etc. are commonly referred to in patents and literature as "butyl rubber," e. g. textbook "Synthetic Rubber" by G. S. Whitby (1954 edition). The expression "butyl rubber" as employed in the specification and claims is defined essentially as a copolymer of about 85 to 99.5% by weight of an isoolefin of about 4 to 8 carbon atoms and about 15 to 0.5% of a diolefin of about 4 to 8 carbon atoms. The preparation of butyl type rubbers is described in U. S. Patent 2,356,128 to Thomas et al.; as well as in literature.

In one process for the preparation of butyl rubber, a low molecular weight isoolefin, preferably isobutylene, is copolymerized with a conjugated diolefin, preferably isoprene, at relatively low temperatures; generally from about 0° C. to about −200° C. or lower; an advantageous range being from about −40° C. to about −160° C., preferably from about −80° C. to −100° C. The copolymerization is conducted in the presence of a Friedel-Crafts catalyst such as aluminum chloride, titanium tetrachloride, boron trifluoride, uranium chloride, aluminum ethoxychloride, etc. preferably dissolved in an alkyl halide such as ethyl or methyl chloride, or dissolved in carbon disulfide or equivalent solvent.

One particularly advantageous butyl rubber is produced with the preferred reactants being about 1 to 5 parts by weight of isoprene and about 99 to 95 parts by weight of isobutylene. The mixture of these reactants is cooled to a temperature within the range of about −50° C. to −150° C. and then polymerized by the addition thereto of a catalyst solution of an aluminum halide, such as aluminum chloride, in methyl chloride. The resulting copolymer preferably has a Staudinger molecular weight between about 25,000–100,000. When so prepared, the material is rubbery in nature and has the property of being curable with sulfur especially in the presence of organic sulfides, particularly of the alkyl thiuram sulfide or thiocarbamate types.

In a preferred embodiment, the present invention comprises an improved vulcanized rubbery self-cleaning white synthetic isoolefin-diolefin rubber composition which has been produced by the process which comprises heating in the presence of vulcanizing amounts of sulfur (preferably about 0.5 to 5.0 parts of sulfur) about 100 parts of a non-staining copolymer of about 95–99.5% isobutylene and about 0.5–5% isoprene, about 20–75, especially 20–50 parts by weight of calcium oxide, about 50 to 100 parts by weight of titanium dioxide, and about 5 or 10 to 20 parts by weight of zinc oxide and advantageously in the presence of about 0.5 to 2.0 parts by weight (preferably about 0.75 to 1.25 parts by weight) of non-staining ultra-accelerators such as an accelerator of the general formula

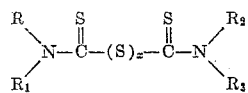

wherein R, $R_1$, $R_2$, and $R_3$ represent aliphatic hydrocarbon radicals, advantageously alkyl groups having about 1 to 5 carbon atoms (preferably 1 to 4 carbon atoms; e. g. tetra butyl thiuram disulfide) and x represents an integer of about 1 to 5 and is preferably 2. Tetramethyl thiuram disulfide has been found to be a particularly advantageous accelerator.

Other less preferred non-staining accelerators include polyalkyl dithiocarbamates containing preferably about two alkyl groups of about 1 to 5 carbon atoms including such compounds as tellurium diethyl dithiocarbamate, zinc dimethyldithiocarbamate, etc. Also, about 0 to 5 parts (and preferably about 0.5 to 3.0 parts) by weight of stearic acid may be present as a mold release agent and about 0 to 5 parts (and advantageously 0.1 to 0.5 parts) of a conventional bluing agent such as Prussian blue or preferably ultramarine blue per 100 parts of the copolymer may likewise be present whereby to produce a white synthetic rubber which after vulcanization is self-cleaning, resistant to weathering and discoloring and suitable for producing white sidewalls of premium grade automobile tires.

Vulcanization of the foregoing composition according to the present invention is advantageous for about 5 minutes to about 2 hours (e. g. 10 to 60 minutes) at about 250° or 275° to 350° F. or for about 1 to 10 minutes at about 350° to 400° or 450° F. The higher the vulcanization temperature, the shorter may be the vulcanizing time and vice versa. The optimum vulcanization conditions appear to be for about 5 to 60 minutes at about 300° to 360° F., preferably at about 320° to 340° F. Insofar as the degree of fineness of the sulfur is concerned, the sulfur may pass through a 50 mesh to about a 500 mesh screen. However, a fineness of about 200 to 350 mesh or finer appears to be preferable for the self-cleaning white rubbery compositions of the invention.

In another embodiment, self-cleaning pastel colored butyl rubber compositions as distinguished from white compositions may be prepared wherein the cure is effected in the presence of such materials as p-dinitrosobenzene, p-quinone dioxime, p-quinone dioxime dibenzoate, etc. and their various homologs and derivatives. Furthermore, for pastel colored butyl rubbers, the cure may be in the presence of such compositions as (1) sulfur and a zinc dialkyl polythiocarbamate; (2) sulfur, lead oxide, and p-quinone dioxime; (3) sulfur, benzothiazyl disulfide and p-quinone dioxime; (4) p-quinone dioxime dibenzoate, lead oxide and sulfur, and (5) sodium and tellurium containing compositions such as tellurium diethyl dithiocarbamate, etc. However, to produce a white butyl rubber, the above compositions are less desirable than the preferred sulfur-poly alkyl thiuram sulfide containing curing composition. To produce pastel colored butyl rubbers, the vulcanization is preferably accomplished by sulfur in the presence of a tetra alkyl thiuram sulfide or a dithiocarbamate and also in the presence of at least 10 or 15 weight percent calcium oxide as well as titanium dioxide and zinc oxide and the desired color is then obtained by adding an additional pigment or pigments to the composition as desired. For pastel shades of rubber, as much as 150 parts by weight of calcium oxide may be used per 100 parts by weight of butyl rubber.

Suitable pigments when employed in minor quantities for pastel butyl rubbers but which are generally unsatisfactory for white butyl rubber compositions are as follows: lead oxide, lead carbonate, barytes, lead sulphate, cadmium lead, calcium carbonate, ferric hydroxide, lead iron oxide, chrome-yellow lead chromate, Prussian blue, phthalocyanine, etc. Inorganic pigments are generally preferred and are employed either alone or in combination with organic pigments according to the color desired. For pastel colored rubbers as distinguished from white rubbers, the white colored representatives of the above pigments or their equivalents may in some cases replace at least a minor portion of the titanium dioxide.

The calcium oxide and rubbery copolymer containing composition of the invention which has been cured, has an improved elastic limit, tensile strength, abrasion resistance and flexure resistance. Also, the mixture before curing may be compounded with various fillers, plasticizers, and anti-oxidants, etc. For example, generally small amounts of conventional non-staining anti-oxidants or even a slightly colored anti-oxidant such as phenyl beta naphthylamine may be employed. The non-staining anti-oxidants which are particularly efficacious for white butyl rubber comprise about 0.1 to 2.0%, advantageously 0.2 to 1.0% and preferably about 0.25% to 0.50% of either alkylated aromatic hydrocarbons or alkylated heterocyclics and include especially the following:

I

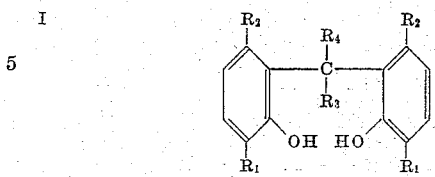

wherein the above anti-oxidant represents an alkylated bisphenol where $R_1$ is a tertiary alkyl group of 3 to 5 carbon atoms and is preferably a tertiary butyl group, $R_2$ represents a $C_1$ to $C_8$ alkyl group (preferably ethyl or methyl) and $R_3$ and $R_4$ represent hydrogen or a $C_1$ to $C_5$ alkyl group. A representative compound is bis(2-hydroxy-3-tertiary butyl-5-methyl phenyl) methane.

II.

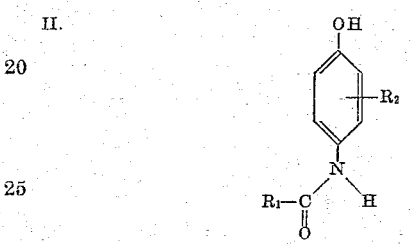

wherein $R_1$ represents a $C_1$ to $C_{14}$ alkyl group (preferably a $C_8$–$C_{14}$ alkyl group) and $R_2$ represents an alkyl group of from 0–18 carbon atoms. A representative compound is lauroyl p-aminophenol.

III. A $C_5$ to $C_9$ alkylated diphenylamine such as heptylated diphenylamine.

The present invention will be best understood from a description of the following examples:

EXAMPLE I

A commercial grade of GR–I–17 rubber containing about 2.5 mol percent isoprene with the balance being isobutylene was compounded as follows:

| | Parts by weight |
|---|---|
| GR–I–17 (non-staining)[1] | 100 |
| Titanium dioxide | 75 |
| Calcium oxide | 25 |
| Stearic acid | 1.0 |
| Zinc oxide | 10 |
| Sulfur | 2.0 |
| Tetra methyl thiuram disulfide | 1.25 |

[1] GR–I–17 made non-staining by adding 0.25 part by weight of lauroyl p-amino phenol thereto. Another suitable material in place of the lauroyl p-amino phenol is 2,2'-methylene bis(4-methyl, 6-tertiary butyl phenol).

The above composition was then cured for 23 minutes at 330° F. and after 19 months of outdoor aging in straight and in looped form according to A. S. T. M. Standard Method D518–44, the composition was not cracked, only very slightly crazed, and not discolored. Its surface exhibited surface powdering which is very desirable to facilitate self-cleaning. Its physical characteristics are now tabulated:

| | |
|---|---|
| Tensile strength (p. s. i.) | 1550 |
| Elongation (percent) | 680 |
| Modulus (p. s. i.): | |
| At 300% E | 250 |
| At 500% E | 535 |
| Hardness, Shore | 51 |

EXAMPLE II

The same copolymer (GR–I–17) as in Example I was composited with various amounts of titanium dioxide, calcium oxide, and zinc oxide per 100 parts by weight of copolymer. These compositions were then vulcanized for 23 minutes at 330° F. in the presence of 2 parts by weight of sulfur and 1.25 parts by weight of tetramethyl thiuram disulfide. The above vulcanizates were then aged in straight and in looped form according to A. S. T. M. Standard Method D518–44. The results are now tabulated in Table I.

Table I

[Parts by weight.]

| Run | TiO$_2$ | ZnO | CaO | Time | Tacky | Discoloration | Cracking | Crazing |
|---|---|---|---|---|---|---|---|---|
| 1 | 100 | | | 8 weeks | Yes | Bad | Slight | Slight. |
| 2 | | 10 | | 8 weeks | Yes | Bad | Slight | Slight. |
| 3 | 100 | 10 | | 8 weeks | Yes | Bad | Slight | Slight. |
| 4 | 100 | 10 | 25 | 19 months | No | None | None | None. |

The above runs in Table I of Example II demonstrate that the use of titanium dioxide alone, zinc oxide alone, or a combination of titanium dioxide, and zinc oxide do not improve discoloration, cracking and crazing, or produce desirable surface powdering. However, the three-component composition of the invention including preferably about 20 to 75 parts by weight of calcium oxide, in addition to the 100 parts by weight of titanium dioxide and 10 parts by weight of zinc oxide per 100 parts of the rubbery copolymer produced a vastly improved composition with substantially no discoloration, cracking or crazing and with the self-cleaning characteristic of surface powdering. The omission of the zinc oxide in the formulation of the invention gave essentially no vulcanization and the omission of the titanium dioxide in the formulation of the invention gave a composition of poorer discoloration and poorer original whiteness.

EXAMPLE III

The same copolymer (GR–I–17) as in Example I was composited with various amounts of titanium dioxide, calcium oxide, zinc oxide, barium oxide and calcium carbonate. When the formulation as in Example I was employed except that the amount of calcium oxide was doubled, excellent results occurred upon vulcanization under the same conditions as in Example I.

However, replacing the calcium oxide in the formulation of Example I with 25 parts by weight of calcium carbonate or with 25 parts by weight of extra titanium dioxide or zinc oxide did not provide adequate resistance to discoloration and surface tack on weathering of the vulcanized composite. Similarly, replacing the calcium oxide with barium oxide caused severe vulcanization retardation.

Referring now to the drawing, the pneumatic tubeless tire shown comprises a hollow toroidal type member which is substantially U-shaped in cross-section by virtue of an open portion which extends around the inner periphery of the member. In other words, the member is of a tubular type structure which has a cross-section in the form of an open-bellied body with spaced terminal portions to define a member generally resembling a horseshoe, wherein the open portion of the horseshoe-shaped-member faces toward the interior circumference of said member. The terminal portions constitute the bead portions 11—11 of the tire, inside of which are a plurality of bead wires adhesively embedded and molded in a rubber. The outer surface of the bead portion is advantageously formed into an air sealing means such as a plurality of ribs to aid in adhesion to rim 12 when the tire is inflated. The remaining outer surface of the tire also includes tread area 13 and sidewalls 14. The remaining construction of the tire may vary according to conventional fabrication but in general the tire is a multi-layered type of structure with an outer layer as above-mentioned. The layer next adjacent the outer layer generally comprises a carcass 15 which includes a rubber such as butyl rubber which has incorporated therein a fabric composed of a plurality of cotton, rayon, or nylon cords, etc. The tire also includes an inner lining 16, advantageously made from butyl rubber which must be substantially impermeable to air. The lining may also advantageously comprise a rubbery copolymer of about 70–99 weight percent of a C$_4$–C$_7$ isoolefin such as isobutylene and about 1–30 weight percent of a C$_4$–C$_{14}$ multi-olefin such as isoprene which has been at least partially vulcanized at least at about 200–350° F. with from about 0.2–10.0 weight percent sulfur based on the weight of the copolymer. The above multi-layers, at least three in number, are conventionally bonded or otherwise adhered together; for example, by vulcanization to form a tire of a unitary structure.

The light colored butyl rubber compositions of the present invention are employed as the sidewall for the rubber tire and are either white or pastel colored. They are likewise conventionally bonded or otherwise adhered (especially by vulcanization) to the tire to form a unitary structure. In such a case, the tubeless tire would comprise a casing of an outer layer including a tread, sidewall, and outer bead portions, etc. wherein the sidewall comprises a rubbery copolymer of a major proportion of an isoolefin and a minor proportion of a multi-olefin, combined with calcium oxide, titanium dioxide and zinc oxide in amounts according to the present invention.

While there are above described a number of specific embodiments of the present invention, it is possible to produce other embodiments thereof since obviously resort may be had to various modifications and variations without departing from the spirit of the invention or the scope of the appended claims.

What is claimed is:

1. A self-cleaning light-colored, vulcanizable rubbery polymeric composition comprising about 100 parts by weight of a rubbery copolymer of a major proportion of an isoolefin and a minor proportion of a C$_4$ to C$_8$ conjugated diolefin, about 20 to 150 parts by weight of calcium oxide, about 25 to 100 parts by weight of titanium dioxide, and about 3 to 50 parts by weight of zinc oxide; said oxides being present in amounts sufficient to lighten and impart improved self-cleaning characteristics as well as weathering and discoloring resistance to the resulting composition.

2. Vulcanization composition according to claim 1 in which said composition contains a vulcanization accelerator in sufficient amount to accelerate vulcanization.

3. A self-cleaning light-colored vulcanizable rubbery polymeric composition of improved weathering and discoloring resistance comprising about 100 parts by weight of a copolymer of a major proportion of isobutylene and a minor proportion of a conjugated diolefin of about 4 to 8 carbon atoms and about 10 to 150 parts by weight calcium oxide, about 10 to 150 parts by weight titanium dioxide and about 3 to 50 parts by weight of zinc oxide.

4. A self-cleaning white vulcanizable composition of improved weathering and discoloring resistance comprising about 100 parts by weight of an isoolefin-multi-olefin butyl rubber copolymer, about 20 to 75 parts by weight calcium oxide, about 25 to 100 parts by weight titanium dioxide and about 5 to 30 parts by weight of zinc oxide.

5. Vulcanizable composition according to claim 4 wherein said composition contains about 0.5 to 2.0 parts by weight of tetramethyl thiuram disulfide.

6. A self-cleaning light-colored vulcanizable rubbery polymeric composition of improved weathering and discoloring resistance comprising about 100 parts by weight of a copolymer of about 90 to 99 weight percent of isobutylene and about 1 to 10 weight percent by weight isoprene, about 20 to 150 parts by weight of calcium oxide, about 25 to 150 parts by weight of titanium dioxide and about 5 to 50 parts by weight of zinc oxide.

7. A self-cleaning stabilized white vulcanized synthetic rubber composition consisting essentially in parts by weight of:

|  | Parts |
|---|---|
| Isoolefin-multiolefin butyl rubber copolymer | 100 |
| Calcium oxide | 10–75 |
| Titanium dioxide | 10–150 |
| Zinc oxide | 5–50 |
| Sulfur | 1–3 |
| Accelerator | 0.5–2.0 |
| Bluing agent | 0–0.3 | said composition being resistant to discoloration and weathering.

8. A self-cleaning vulcanized light-colored rubbery composition of improved weathering and discoloring resistance which has been produced by the process which comprises heating at about 275° F. to 400° F. in the presence of a vulcanizing agent, about 100 parts by weight of a copolymer of a major proportion of an isoolefin of about 4 to 8 carbon atoms, and a minor proportion of a conjugated diolefin of about 4 to 14 carbon atoms and about 10 to 150 parts of calcium oxide, about 10 to 150 parts of titanium dioxide, and about 5 to 50 parts by weight of zinc oxide, for a time sufficient to vulcanize the composition.

9. Composition according to claim 8 in which the isoolefin is present in an amount of about 90 to 99.5% by weight, the multiolefin is a conjugated diolefin containing about 4 to 8 carbon atoms and is present in an amount of about 0.5 to 10 parts by weight; the calcium oxide being present in an amount of about 20 to 75 parts by weight, the titanium dioxide being present in an amount of about 25 to 100 parts by weight, the zinc oxide being present in an amount of about 5 to 30 parts by weight, the sulfur being present in an amount of about 1 to 5 parts by weight.

10. An isoolefin-multiolefin butyl rubber copolymer-containing tire having as a self-cleaning light-colored sidewall thereof a vulcanized isoolefin-multiolefin butyl rubber copolymer containing composition which has been produced by the process which comprises heating at about 275° F. to 400° F. in the presence of a vulcanizing agent and sufficient amounts of an accelerator to accelerate the vulcanization, about 100 parts by weight of the butyl rubber copolymer, about 10 to 75 parts by weight of calcium oxide, about 25 to 100 parts by weight of titanium dioxide, and about 5 to 30 parts by weight of zinc oxide.

11. A tubeless tire containing as a self-cleaning sidewall thereof, a vulcanized rubbery polymeric composition of improved weathering and discoloring resistance comprising about 100 parts by weight of a copolymer of about 90 to 99 weight percent of an isoolefin of about 4 to 7 carbon atoms and about 1 to 10 weight percent of conjugated diolefin of about 4 to 10 carbon atoms, about 20 to 150 parts by weight of calcium oxide, about 25 to 100 parts by weight of titanium dioxide, and about 5 to 30 parts by weight of zinc oxide.

12. The tire of claim 11 wherein the composition of the sidewall contains accelerating amounts of a vulcanization accelerator and sufficient amounts of a bluing agent to enhance the whiteness of the composition.

13. An automobile tire which contains as a self-cleaning white sidewall thereof a composition comprising about 100 parts by weight of a rubbery copolymer of a major proportion of an isoolefin and a minor proportion of a $C_4$ to $C_8$ conjugated diolefin, about 10 to 150 parts by weight of calcium oxide, about 10 to 150 parts by weight of titanium dioxide, and about 3 to 50 parts by weight of zinc oxide; said oxides being present in amounts sufficient to lighten and impart weathering and discoloring resistance to the composition.

14. A self-cleaning sidewall suitable for application to premium grade tires which consists essentially of a light-colored vulcanized rubbery polymer composition of improved weathering and discoloring resistance comprising about 100 parts by weight of a copolymer of a major proportion of a $C_4$–$C_8$ isoolefin and a minor proportion of a $C_4$–$C_8$ conjugated diolefin, about 20 to 75 parts by weight of calcium oxide, about 25 to 100 parts by weight of titanium dioxide, and about 5 to 30 parts by weight of zinc oxide.

15. A self-cleaning white sidewall for a butyl rubber tubeless tire which consists essentially of a vulcanized white rubbery composition of improved weathering and discoloring resistance which has been produced by the process which comprises heating at about 300° F. to 360° F. in the presence of vulcanizing amounts of sulfur, about 100 parts by weight of a copolymer of about 85 to 99% by weight of an isoolefin of about 4 to 7 carbon atoms and about 1 to 15 parts by weight of a conjugated diolefin of about 4 to 8 carbon atoms, about 20 to 75 parts of calcium oxide, about 10–100 parts by weight of titanium dioxide, and about 5 to 50 parts by weight of zinc oxide for a time sufficient to vulcanize the composition.

16. In a tire adapted for use without an inner tube, the combination which comprises an open-bellied body terminating in spaced bead portions having an inner lining of an isoolefin-multiolefin butyl rubber copolymer, an intermediate carcass layer comprising a rubber and a plurality of tire cords, air-sealing means at said bead portions, and an outer layer comprising a tread area intermediate of said bead portions and two opposing light-colored sidewalls wherein the composition of at least said sidewalls comprises an isoolefin-multiolefin butyl rubber copolymer, 100 parts by weight of which is in admixture with about 20 to 150 parts by weight of calcium oxide, about 25 to 100 parts by weight of titanium dioxide, and about 3 to 50 parts by weight of zinc oxide; said oxides being present in amounts sufficient to lighten and impart self-cleaning characteristics as well as weathering and discoloring resistance thereto.

17. In a process for manufacturing a tubeless tire including a carcass member containing a major proportion of an isoolefin-multiolefin butyl rubber copolymer, the combination which comprises at least partially vulcanizing to said carcass member a layer disposed interiorly thereof, which layer comprises a rubbery copolymer which has been at least partially vulcanized, said copolymer containing about 70 to 99.5 weight percent of an isoolefin and a minor proportion of a multi-olefin reactive therewith, and completely vulcanizing to said carcass member a layer disposed exteriorly thereof comprising an admixture of about 100 parts by weight of a rubbery copolymer containing about 85 to 99.5 weight percent of a $C_4$ to $C_7$ isoolefin and a minor proportion of a $C_4$ to $C_{10}$ multi-olefin, with about 10 to 150 parts by weight of calcium oxide, about 10 to 150 parts by weight of titanium dioxide and about 3 to 50 parts by weight of zinc oxide whereby to lighten and impart self-cleaning characteristics as well as weathering and discoloring resistance thereto.

18. A process of producing a white sidewall for a butyl rubber tire which comprises heating at about 275° F. to 350° F. in the presence of vulcanizing amounts of sulfur, about 100 parts by weight of a copolymer of about 70 to 99% by weight of an isoolefin of about 4 to 7 carbon atoms and about 1 to 30 parts by weight of a conjugated diolefin of about 4 to 8 carbon atoms and about 20 to 150 parts of calcium oxide, about 10–100 parts by weight of titanium dioxide, and about 5–50 parts by weight of zinc oxide for a time sufficient to vulcanize the composition.

19. A process for producing a self-cleaning light-colored rubbery composition of improved discoloring resistance which comprises vulcanizing for about 5 to 60 minutes at about 300° to 350° F. in the presence of about 1 to 3 parts by weight of sulfur and about 0.5 to 2.0 parts by weight of tetramethyl thiuram disulfide, about 100 parts by weight of a copolymer of about 95 to 99 weight percent of isobutylene and about 1 to 5 weight percent isoprene, about 25 to 100 parts by weight titanium dioxide, about 20 to 50 parts by weight of calcium oxide, about 0 to 2 parts by weight stearic acid, about 0.05 to 0.5 part by weight of ultramarine blue, and about 5 to 30 parts by weight of zinc oxide; said sulfur being of a size at least sufficiently fine to pass through a 200 mesh screen, whereby to produce a vulcanized rubbery composition having a tensile strength of at least about 1000 p. s. i., a percent of elongation of at least 500% and a Shore hardness of at least about 40.

References Cited in the file of this patent

UNITED STATES PATENTS

| | | |
|---|---|---|
| 2,566,329 | Hessney et al. | Sept. 4, 1951 |
| 2,600,943 | Van Valkenburgh | June 17, 1952 |
| 2,702,286 | Iknayan et al. | Feb. 15, 1955 |